Nov. 7, 1933.  G. JOHNSON  1,934,071
FASTENING KNOB FOR USE IN HAND BAG FRAMES AND METHOD OF MAKING THE SAME
Filed Aug. 18, 1932
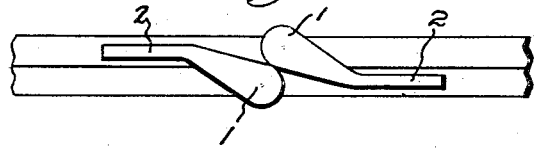
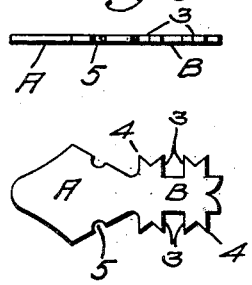
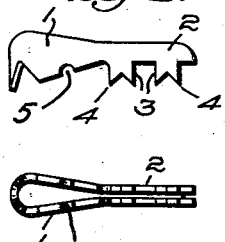
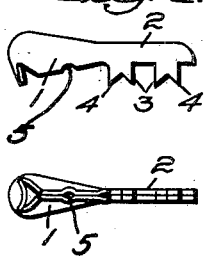
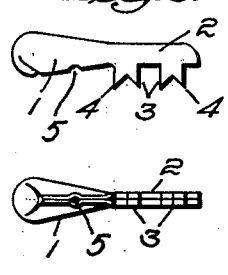
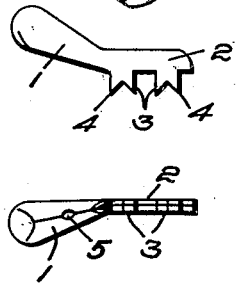
Inventor:
Gustav Johnson,
by Emery, Booth, Varney & Townsend
Attys Patented Nov. 7, 1933

1,934,071

UNITED STATES PATENT OFFICE 1,934,071

FASTENING KNOB FOR USE IN HAND BAG FRAMES AND METHOD OF MAKING THE SAME

Gustav Johnson, West Roxbury, Mass., assignor to United-Carr Fastener Corporation, Cambridge, Mass., a corporation of Massachusetts Application August 18, 1932. Serial No. 629,327

2 Claims. (Cl. 113—116)

My invention aims to provide improvements in fastening knobs for use in handbag frames and similar structures and the method of making the fastening knobs.

In the drawing which illustrates a preferred embodiment of my invention:—

Figure 1 is a plan view of a portion of a pair of bag frames showing the use of my improved fastening knobs;

Fig. 2 is a side and a plan view, respectively, of a flat sheet metal blank from which a fastener knob is formed;

Figs. 3, 4 and 5 each include a side elevation and a bottom plan showing some of the different steps in the method of forming my improved device; and Fig. 6 is a side elevation and a bottom plan view, respectively, of my completed device before attachment to a frame structure.

The specific form of my invention illustrated by the drawing is particularly, though not exclusively, useful in connection with frame members of ladies' handbags and purses. My improved fastener knobs are made from single piece metal blanks, one side of the center line of which is symmetrical with the other side, as best shown in Fig. 1. This symmetrical blank is highly desirable because the method of forming is simplified and the resulting device is strong and durable.

Each device has a hollow elongated bulbous fastener portion 1 and an attaching portion 2, as best shown in Figs. 1 and 6. The attaching portion 2 has a double wall and is provided with attaching elements 3, herein shown as four in number. Two of the attaching elements 3 are on one wall of the attaching portion 2 and the other two are on the other wall, as shown in Figs. 3 and 6. However, when the device is used the opposed elements 3 (Fig. 6) comprise, in effect, a single attaching element and therefor there are in reality but two attaching elements 3. These attaching elements 3 have their ends cut to provide prongs 4 which are easily upset laterally to rivet the ends against the structures to which the fastener knobs are to be attached.

The sheet metal blank (Fig. 2) has a substantially spear-shaped portion A and a substantially H-shaped portion B, so formed to make up the various elements of the device when folded together. The spear-shaped portion A is formed into the fastener portion 1 (Fig. 6) and the H-shaped portion B is formed into an attaching portion 2.

I have not shown in the drawing all of the steps in the process of forming my preferred invention because in forming the device one operation may change the form only slightly from the preceding step. Therefore I have illustrated only the main steps in the process. In carrying out the process, the blank is folded along the center line and the nose of the spear-shaped portion A is bent up to form the blank into a shape as shown in Fig. 3. Then the side portions of the attaching portion 2 are pressed into contact and the free edges of the spear-shaped portion 1 folded inwardly as shown in Fig. 4. Further pressing operations upon the spear-shaped portion shape the fastener portion as shown in Figs. 5 and through 6 to close the fastener portion, leaving only a seam along substantially the full length of the device with exception of the hole 5 in the fastener portion.

I provide an aperture 5 at the seam to permit complete draining of the cleaning and plating liquids from the fastener portion. If the liquids are permitted to remain in the devices to seep out after they have been attached, it will be clear to those skilled in the art that injury would result to the bag structure and discoloration take place in the fastener knobs themselves. Therefore the tiny hole 5 is an important feature because it permits complete manufacture of the units before plating and finishing, while permitting the shipment of perfectly dry devices free from any injurious liquids.

The fastener knobs illustrated may be secured to the frame members in the usual manner by spreading the pronged ends of the attaching elements and flattening them against the underside walls of the frame members. These fastener knobs are particularly strong and durable because the folded over formation provides a double wall in the attaching portion and therefore a double connection with the fastener portion as clearly illustrated in Fig. 6 and particularly because the knob proper is so formed that the neck portion thereof, adjacent the aperture 5, consists of walls spaced apart for strength, clear down to a point very close to the bag frame and point of attachment of the knob thereto, thus rendering the knobs much less liable to bending out of line than if the walls of the neck portion were compressed against one another.

While I have illustrated and described a preferred form of my device and method of making the same, I do not wish to be limited thereby because the scope of my invention is best defined by the following claims.

I claim:

1. A fastener knob of the class described comprising an attaching portion and a fastener portion, said knob being formed from a folded one-piece sheet metal blank and having a seam extending the entire length of the under side of the knob, said attaching portion comprising a folded flat portion and said fastener portion comprising a hollow elongated bulbous portion having its side walls spaced apart substantially to its point of juncture with said attaching portion.

2. The method of making a fastener knob of the class described which comprises forming a flat sheet metal blank having a substantially spear-shaped portion and a substantially H-shaped portion, forming the H-shaped portion into an attaching means and forming the spear-shaped portion into an elongated hollow fastener portion with its side walls spaced apart substantially to its point of juncture with said attaching means and with a permanent opening at the seam between said spaced side walls to thus completely form the fastener knob, and then cleaning and coating the completed knob.

GUSTAV JOHNSON.